UNITED STATES PATENT OFFICE.

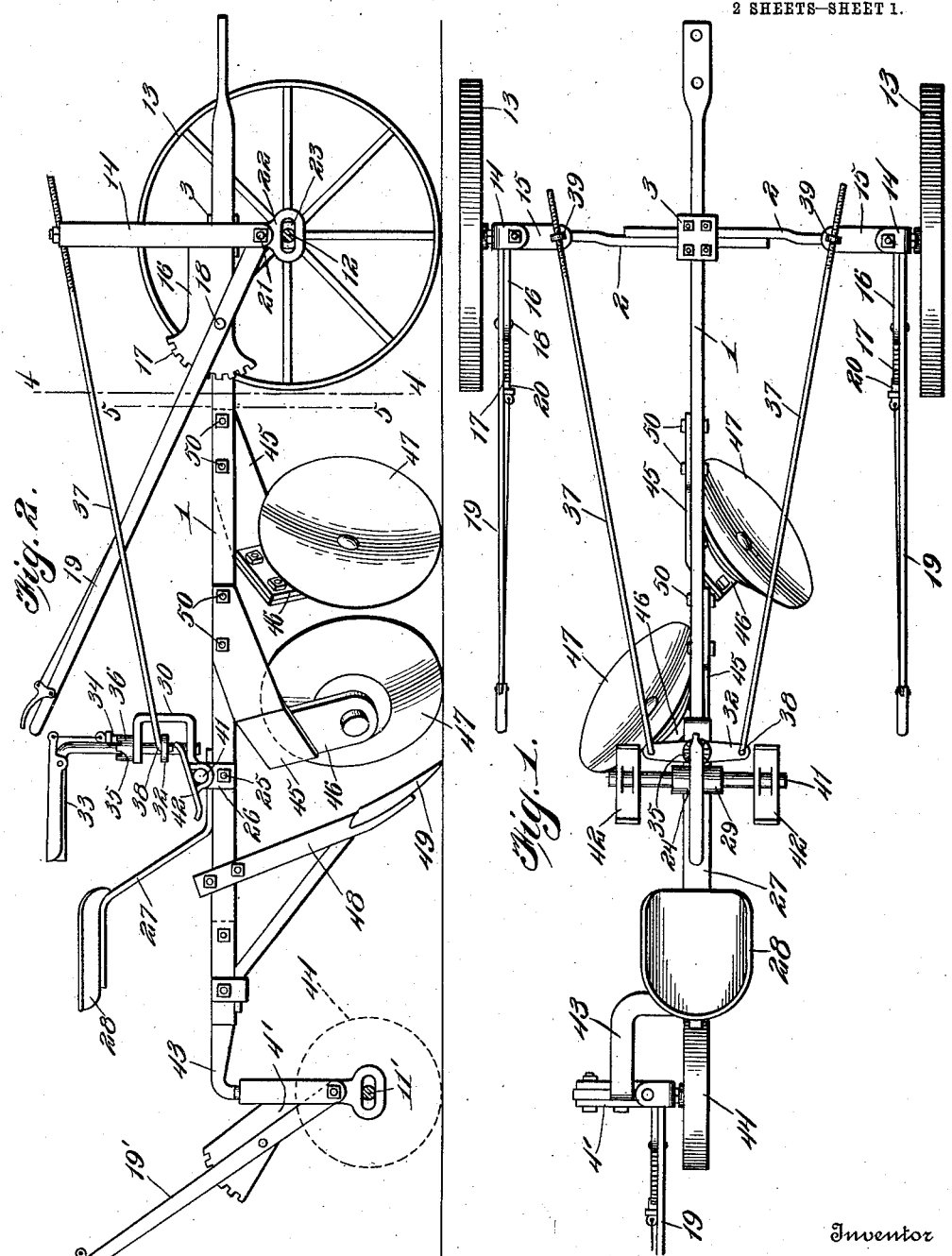

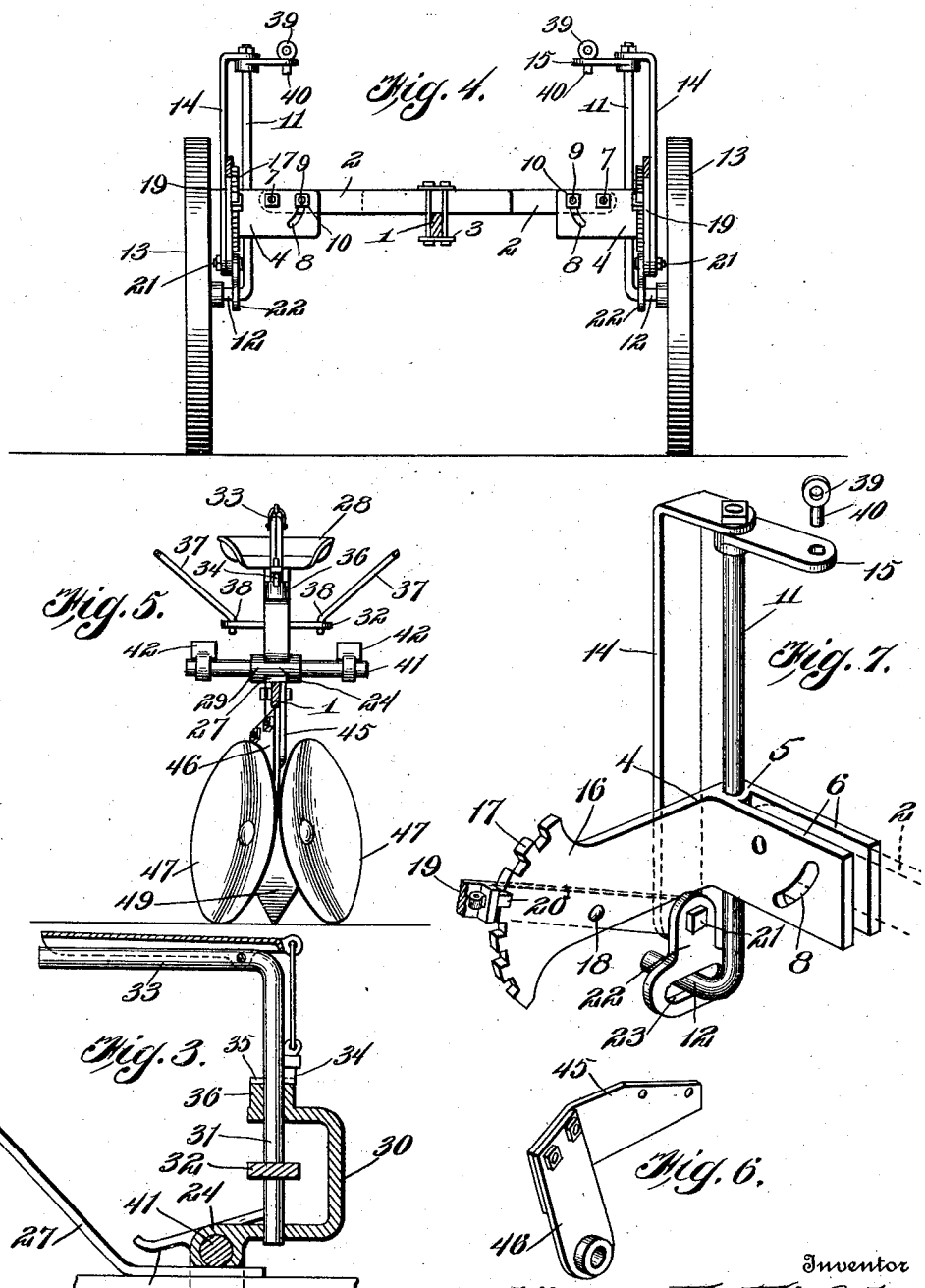

WILLIAM F. FIELDER, OF LOCKHART, TEXAS.

PLOW.

1,079,850.  Specification of Letters Patent.  Patented Nov. 25, 1913.

Application filed February 19, 1913. Serial No. 749,472.

*To all whom it may concern:*

Be it known that I, WILLIAM F. FIELDER, a citizen of the United States, residing at Lockhart, in the county of Caldwell and State of Texas, have invented new and useful Improvements in Plows, of which the following is a specification.

This invention relates to riding disk plows, and it has for its object to produce a breaking plow of simple and improved construction including a pair of disks supported to turn the dirt in opposite directions to form an intermediate ridge, and an auxiliary plow of the bull tongue or other approved type to burst said ridge for the purpose of leveling and scattering the soil.

A further object of the invention is to produce a simple and efficient supporting and adjusting means for the plows.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a top plan view of a plow constructed in accordance with the invention. Fig. 2 is a side elevation. Fig. 3 is a longitudinal sectional view. Fig. 4 is a transverse sectional view taken on the line 4—4 in Fig. 1, and looking in a forward direction. Fig. 5 is a transverse sectional view taken on the line 5—5 in Fig. 1, and looking in a rearward direction. Fig. 6 is a perspective detail view of one of the disk supports. Fig. 7 is a perspective detail view of one of the bearing members.

Corresponding parts in the several figures are denoted by like characters of reference.

The main beam 1 of the improved machine supports a pair of cross bars 2, 2 which overlap one another, said cross bars being secured adjustably on the main beam by means of a clip 3. Each cross bar carries at its outer end a pivoted bearing member 4, said bearing member comprising a sleeve 5 and a pair of substantially parallel flanges 6 which are apertured for the reception of the bolt or pivot member 7. The flanges 6 are also provided with arcuate slots 8 for the passage of an adjusting member, such as a bolt 9, that extends through the cross bar 2 and which is provided with a nut 10 by tightening which the bearing member may be secured in position at various adjustments, while by loosening the nut the bearing member may be tilted in various directions. The sleeve 5 of each bearing member supports an approximately vertical shaft 11 having at its lower end an axle stub 12 on which a wheel 13 is supported for rotation. Each shaft 11 supports an angular or L-shaped bracket 14 and a crank 15, the latter being fixed on the shaft so that the latter may be rotated in its bearing by means of said crank. The bearing member 4 is provided with an arcuate flange 16 having a toothed edge 17, said flange serving to support a fulcrum member 18 on which a hand lever 19 is pivoted. One arm of the hand lever carries a stop member 20 engaging the toothed edge of the arcuate flange 16; the other arm of the lever is pivotally connected with the angular bracket 14 by means of a pin or bolt 21 on which is mounted a downwardly extending lug 22 having a slot 23 through which the axle stub 12 extends and wherein said axle stub is supported. An angular L-shaped bracket 14 constitutes a link between the lever 19 with which it is pivotally connected and the shaft 11 with which it is connected in a manner that will enable the link to have sufficient play to permit the lower end thereof to swing or move in an arc about the axis of the fulcrum member 18. It will be seen that the pivotally supported slotted lug, while affording a perfect support for the stub, will permit the latter to swing freely in an approximately horizontal plane when the shaft 11 is rotated about its axis by means of the crank 15. It will be observed that the wheels 13 which constitute ground engaging supporting wheels may be tilted to various angles by properly adjusting the bearing members 4 with respect to the bolts 9 that operate in the arcuate slots 8 of said bearing members. By actuating the crank 15 the shafts 11 may be rocked about their respective axes so as to adjust the transporting wheels for the purpose of guiding the machine in the desired direction.

A cleat 24 which is secured on the beam 1 by means of a bolt 25 that extends through downwardly extending lugs or flanges 26 of said clip, serves to secure in position the seat bar 27 carrying the seat 28. Said clip is also formed with a transverse sleeve 29 and with an upwardly extending U-shaped bracket 30, the latter affording a bearing for an upright shaft 31 carrying a cross bar 32 and having at its upper end an operating lever 33 equipped with a stop member 34 adapted to engage any one of a series of notches 35 in a collar 36 that extends upwardly from the U-shaped bracket 30. The cross bar 32 is connected with the cranks 15 by means of link rods 37 having hooks 39 engaging apertures in the cross bar 32; said link rods are provided with screw threaded portions on which nuts 39 are adjustably mounted, said nuts being provided with pins 40 engaging apertures in the cranks 15. Adjustment may thus be made to vary the distance between the cranks and the cross bar, as may be needed when the cross bars 2 are moved forwardly or rearwardly with respect to the main beam or when for any reason such adjustment shall be needed. The sleeve 29 of the clip 24 accommodates a rod 41 carrying foot rests 42.

The rear end of the main beam 1 supports an angular bracket 43 on which a bearing member 4′ is adjustably supported, said bearing member being in all respects similar to the bearing members 4 previously described, and said bearing member serving to support a shaft 11′ carrying a trail wheel 44, whereby the rear end of the frame of the machine is supported, said trail wheel being capable of ordinary adjustment with respect to the frame by means of a hand lever 19′, and said trail wheel being also capable of being tilted to various inclinations by proper adjustment of the bearing member 4′.

Bolted or otherwise secured on the main beam 1 in rear of the cross bars 2 are angular brackets 45 supporting standards 46 on which plow disks 47 are supported for rotation, one in advance of the other, and said disks being arranged to turn the dirt in opposite directions, outwardly from the medial line of the machine so as to produce a ridge. A standard 48 mounted on the main beam in rear of the rearmost disk carries a plow blade 49 of the bull tongue or any other approved type for bursting the ridge formed by the action of the disks. The lateral distance between the disks may be varied by securing both bracket members 45 on one side of the main beam, as will be readily understood. It will be further understood that the construction may be varied by mounting both brackets 45 on the same bolts or supporting members 50, thereby placing the disks side by side instead of the tandem arrangement illustrated in the drawings.

As will be seen from the foregoing description, taken in connection with the drawings hereto annexed, I have produced a plow of simple and efficient construction which may be conveniently used for breaking purposes. It should be understood that the frame may be utilized for supporting disk carrying brackets of such a nature that the disks will be faced in one direction, thereby enabling regular furrows to be turned. When such arrangement is made, a disk carrying standard may be substituted for the plow carrying standard 48. The supporting wheels may be readily tilted and adjusted according to the work that is to be performed, and adjustment of said wheels may also be readily made to elevate the frame when the machine is to be transported from one place to another.

Having thus described the invention, what is claimed as new, is:—

1. In a plow, a frame bar, a tiltable bearing member pivoted on the frame bar, said bearing member including a sleeve and a flange having an arcuate toothed edge, means for securing the bearing member at various adjustments, a vertical shaft journaled in the sleeve, said shaft having an axle stub, a wheel supported on the latter, an angular bracket supported on the shaft, a hand lever fulcrumed on the toothed flange of the bearing member and having a stop member engaging the toothed edge of the flange, a pivoted member connecting an arm of said hand lever with the angular bracket, and a lug supported on the pivot member and having a slot through which the axle stub extends.

2. In a plow of the character described, a main beam, supporting means for said beam including a pair of cross bars, tiltable bearing members secured on said cross bars, vertical wheel carrying shafts journaled in the bearing members, and means whereby said shafts may be vertically adjusted, cranks fixed on the wheel carrying shafts, a clip secured on the main beam and including a sleeve and an upstanding U-shaped bracket having an upwardly extending notched collar, a seat supporting bar secured by the clip, a shaft journaled in the upstanding U-shaped bracket, a hand lever on said shaft having a stop member engaging the notched collar, a cross bar on said shaft, links connecting said cross bar with the cranks on the wheel carrying shafts, and a rod seated in the sleeve of the clip and having foot rests connected therewith.

In testimony whereof I affix my signature in presence of two witnesses.

WILLIAM F. FIELDER.

Witnesses:
T. H. BROWN, Jr.,
H. W. FIELDER.

Copies of this patent may be obtained for five cents each, by addressing the "Commissioner of Patents, Washington, D. C."